United States Patent
Etzkorn et al.

(10) Patent No.: US 9,768,451 B2
(45) Date of Patent: *Sep. 19, 2017

(54) BATTERY

(71) Applicant: Verily Life Sciences LLC, Mountain View, CA (US)

(72) Inventors: James Etzkorn, Mountain View, CA (US); Ramesh Bhardwaj, Mountain View, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/249,164

(22) Filed: Aug. 26, 2016

(65) Prior Publication Data

US 2016/0365584 A1    Dec. 15, 2016

Related U.S. Application Data

(63) Continuation of application No. 14/163,663, filed on Jan. 24, 2014, now Pat. No. 9,455,423.

(51) Int. Cl.
*H01M 6/18* (2006.01)
*H01M 6/40* (2006.01)
(Continued)

(52) U.S. Cl.
CPC ........... *H01M 6/40* (2013.01); *H01M 2/0202* (2013.01); *H01M 2/026* (2013.01);
(Continued)

(58) Field of Classification Search
CPC ........ H01M 2/0202; H01M 4/08; H01M 4/75; H01M 6/22; H01M 6/40; H01M 10/0436;
(Continued)

(56) References Cited

U.S. PATENT DOCUMENTS 5,682,210 A    10/1997  Weirich
8,420,252 B2    4/2013  Shakespeare et al.
(Continued)

FOREIGN PATENT DOCUMENTS

JP    4686134    5/2011

OTHER PUBLICATIONS

International Searching Authority, International Search Report and Written Opinion for PCT/US2015/011004, mailed Apr. 24, 2015, 13 pages.

*Primary Examiner* — Brittany Raymond
(74) *Attorney, Agent, or Firm* — McDonnell Boehnen Hulbert & Berghoff LLP

(57) ABSTRACT

A battery includes an electrolyte disposed on a substantially planar substrate. The electrolyte has a first surface extending from the substrate and in contact with a cathode. The electrolyte has a second surface extending from the substrate and in contact with an anode. The second surface is opposite the first surface. The anode and the cathode are non-overlapping. The battery additionally includes a biocompatible protective layer that covers the electrolyte and at least portions of the anode and cathode. The battery can be disposed in an eye-mountable device or other device to power electronics in the device. The battery can be configured to be rechargeable.

19 Claims, 5 Drawing Sheets

(51) Int. Cl.
*H01M 2/02* (2006.01)
*H01M 2/10* (2006.01)
*H01M 10/04* (2006.01)

(52) U.S. Cl.
CPC ......... *H01M 2/1094* (2013.01); *H01M 6/181* (2013.01); *H01M 6/187* (2013.01); *H01M 10/0436* (2013.01); *H01M 2220/30* (2013.01); *H01M 2300/0085* (2013.01); *Y10T 156/10* (2015.01)

(58) Field of Classification Search
CPC .............. H01M 2220/30; Y02E 60/124; Y10T 29/49115
See application file for complete search history.

(56) References Cited

U.S. PATENT DOCUMENTS

| | | | |
|---|---|---|---|
| 9,455,423 B2 | 9/2016 | Etzkorn et al. | |
| 2002/0020946 A1* | 2/2002 | Hiraoka | B29C 35/08 264/485 |
| 2002/0110733 A1 | 8/2002 | Johnson | |
| 2009/0297938 A1 | 12/2009 | Hoofman et al. | |
| 2010/0001926 A1 | 1/2010 | Amirparviz et al. | |
| 2011/0183183 A1 | 7/2011 | Grady et al. | |
| 2012/0236524 A1* | 9/2012 | Pugh | G02C 7/04 361/783 |
| 2012/0276434 A1 | 11/2012 | Gaikwad et al. | |
| 2013/0034760 A1* | 2/2013 | Otts | H01M 4/668 429/94 |
| 2013/0278887 A1 | 10/2013 | Legerton | |
| 2014/0002788 A1* | 1/2014 | Otts | G02C 7/04 351/159.03 |

* cited by examiner

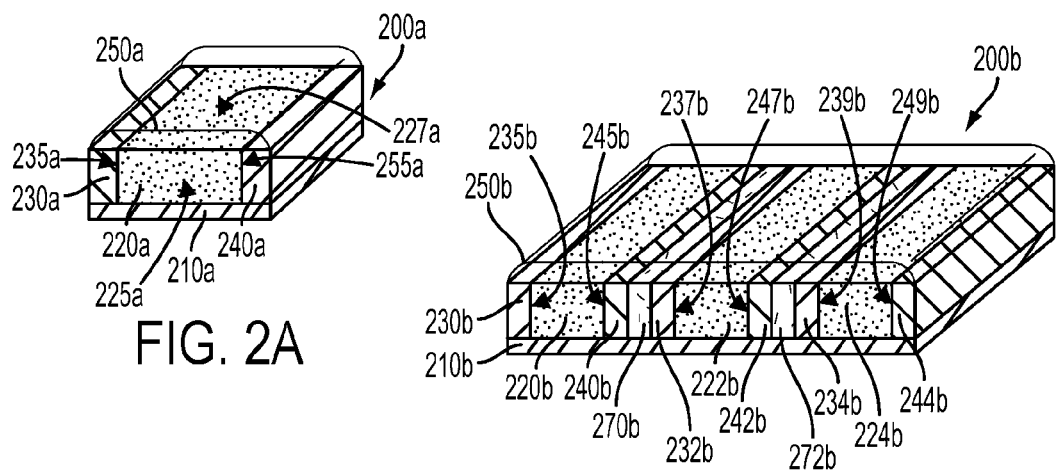
FIG. 2A
FIG. 2B
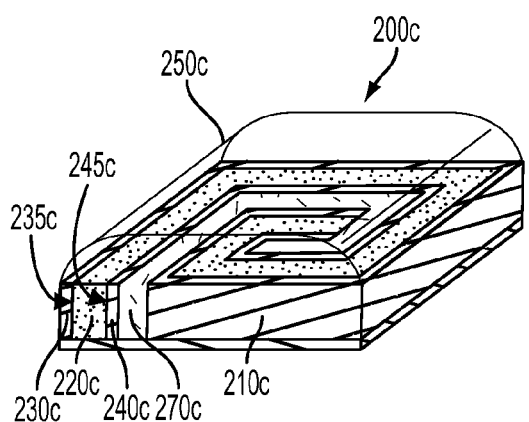
FIG. 2C
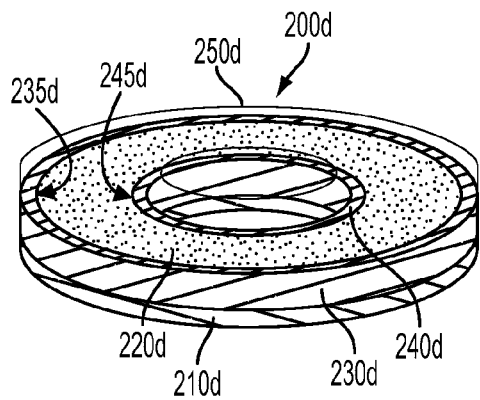
FIG. 2D
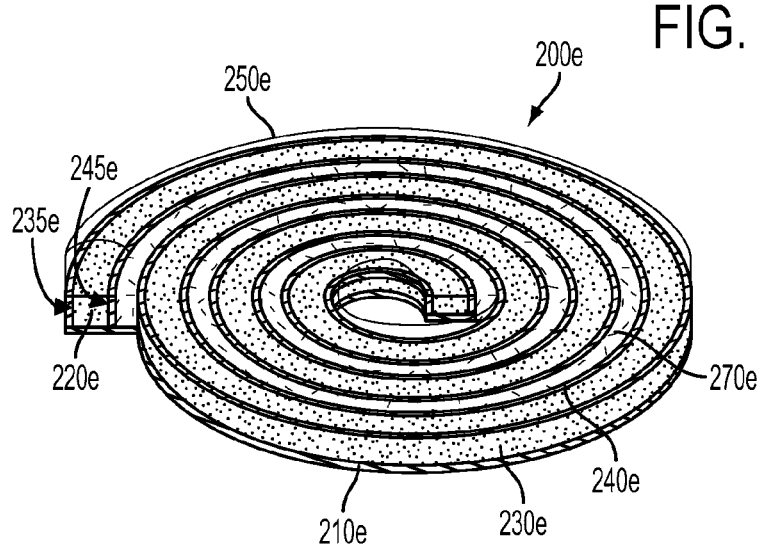
FIG. 2E

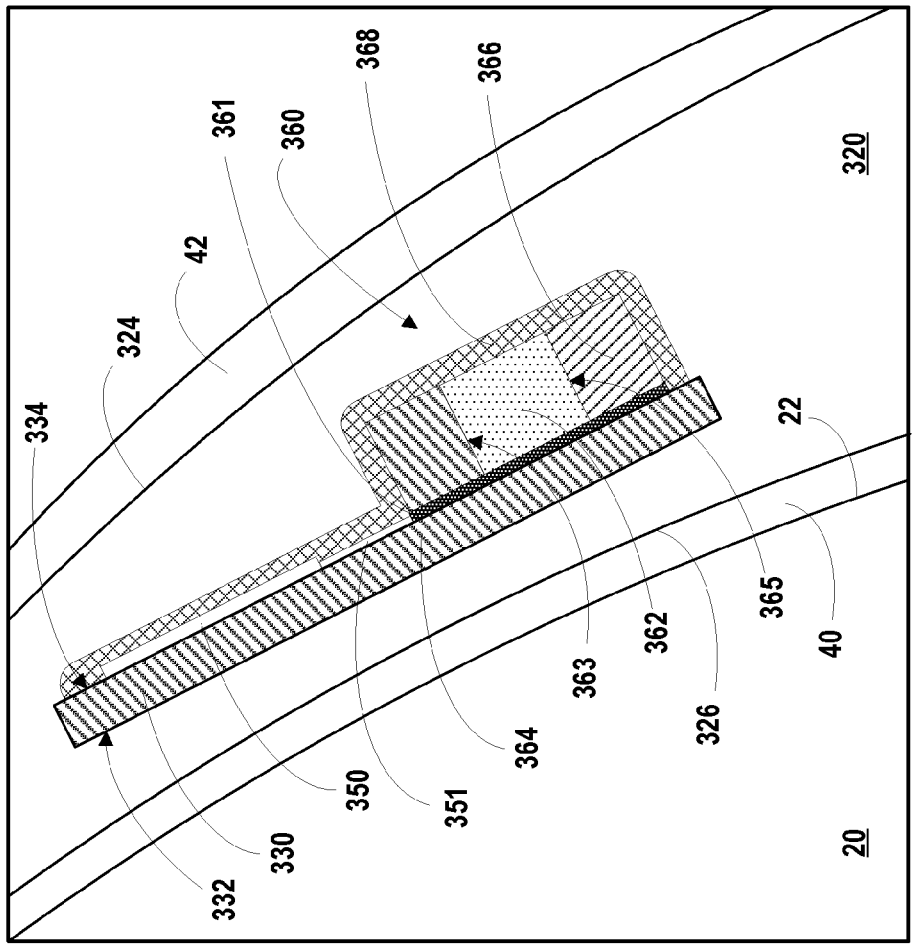
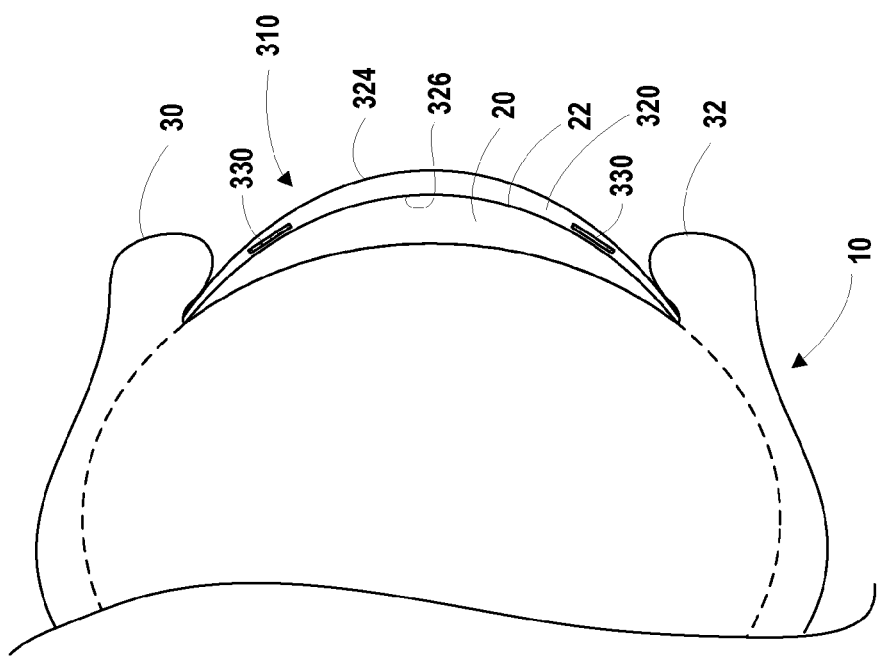
FIG. 3D
FIG. 3C

BATTERY

CROSS-REFERENCE TO RELATED APPLICATION

This application is a continuation of U.S. patent application Ser. No. 14/163,663, filed Jan. 24, 2014, which application is incorporated herein by reference.

BACKGROUND

Unless otherwise indicated herein, the materials described in this section are not prior art to the claims in this application and are not admitted to be prior art by inclusion in this section.

The rise to ubiquity of small, battery-powered devices is due in part to advances in battery technology. Advances in battery technology have enabled the fabrication of tiny, high-energy-density electrochemical batteries capable of powering advanced devices for extended periods of time while occupying small volumes. An electrochemical battery comprises an electrolyte interposed between two electrodes (an anode and a cathode). Electrochemical reactions between the anode and the electrolyte and between the electrolyte and the cathode can cause the development of an electrical potential between the electrodes. Continued electrochemical reactions could drive an electrical current from one electrode, through a device connected to the electrodes, to the opposite electrodes, allowing the device to perform some function using the electrical current.

SUMMARY

Some embodiments of the present disclosure provide a battery including: a substrate, wherein the substrate is substantially planar; an electrolyte disposed on the substrate, wherein the electrolyte has a first surface extending from the substrate and a second surface extending from the substrate and opposite the first surface; a cathode disposed on the substrate and in contact with the first surface of the electrolyte; an anode disposed on the substrate and in contact with the second surface of the electrolyte, wherein the anode and cathode are non-overlapping; and a biocompatible protective layer, wherein the biocompatible protective layer covers the electrolyte and at least portions of the cathode and anode.

Some embodiments of the present disclosure provide a body mountable device including: a shaped polymeric material; and a battery embedded within the shaped polymeric material. The battery can include a substrate, wherein the substrate is substantially planar; an electrolyte disposed on the substrate, wherein the electrolyte has a first surface extending from the substrate and a second surface extending from the substrate and opposite the first surface; a cathode disposed on the substrate and in contact with the first surface of the electrolyte; an anode disposed on the substrate and in contact with the second surface of the electrolyte, wherein the anode and cathode are non-overlapping; and a biocompatible protective layer, wherein the biocompatible protective layer covers the electrolyte and at least portions of the cathode and anode.

Some embodiments of the present disclosure provide a method including: forming a substrate, wherein the substrate is substantially planar; forming an electrolyte on the substrate, such that the electrolyte has a first surface extending from the substrate and a second surface extending from the substrate and opposite the first surface; forming a cathode on the substrate, such that the cathode is in contact with the first surface of the electrolyte; forming an anode on the substrate, such that the anode is in contact with the second surface of the electrolyte, and the anode and cathode are non-overlapping; and forming a biocompatible protective layer, such that the biocompatible protective layer covers the electrolyte and at least portions of the cathode and anode.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIGS. 2A-2E are perspective views of batteries disposed on substrates.

FIG. 3C is a side cross-section view of the example eye-mountable device shown in FIGS. 3A and 3B while mounted to a corneal surface of an eye.

FIG. 3D is a close-in side cross-section view of the example eye-mountable device shown in FIGS. 3A and 3B while mounted to a corneal surface of an eye.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

An electrochemical battery can comprise an electrolyte interposed between two electrodes (an anode and a cathode) arranged on opposite surfaces of the electrolyte. The energy capacity of the battery can be related to the total volume of the electrolyte. As such, increasing the area of the electrodes and/or increasing the thickness of the electrolyte between the electrodes can increase the energy capacity of the battery. The thickness of an effective battery can be limited by diffusion in the electrolyte or by other chemical processes occurring in the electrolyte and/or electrodes such that the capacity of the battery cannot be increased by an increase of thickness beyond an effective maximum thickness. The battery can be fabricated on a substrate, and can further include a biocompatible protective layer to prevent degradation of the battery by substances in the environment of the battery.

Figure 1A:
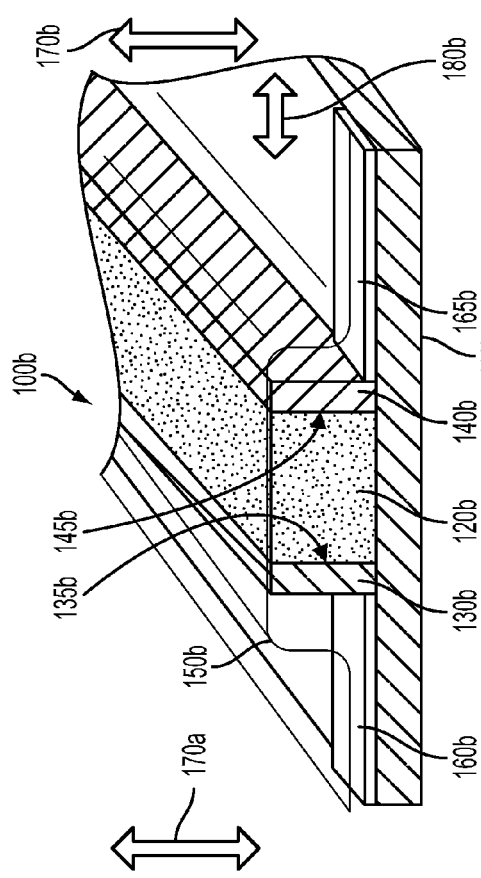
FIGS. 1A-1D are perspective and cross-sectional views of batteries disposed on substrates.

As illustrated in FIG. 1A, an example electrochemical battery 100a could be fabricated by disposing, on a substantially planar substrate 110a, layers parallel to the substrate 110a including a cathode 130a, an electrolyte 120a, an anode 140a, and a biocompatible protective layer 150a. The battery could be electronically coupled to other components by interconnects 160a, 165a. An energy capacity of the battery 100a could be increased by increasing the area of the layers (i.e., the cathode 130a, anode 140a, electrolyte 120a, and biocompatible protective layer 150a) and/or by increasing the thickness (defined as a measurement in the vertical direction 170a) of the electrolyte 120a (up to a diffusion-limited maximum thickness). The layers 120a, 130a, 140a, 150a could have minimum thicknesses (measured in the vertical direction 170a) determined by functional and/or fabrication limitations. For example, the anode 140a and/or cathode 130a could have minimum thicknesses to ensure adequate conduction. For example, a method used to deposit the anode 140a and/or cathode 130a could have a minimum deposited layer thickness. As a result, the battery 100a fabricated from layers 120a, 130a, 140a, 150a formed atop a substrate 110a such that the layers 120a, 130a, 140a, 150a were parallel to the substrate 110a could have a minimum overall thickness that was the sum of the minimum thicknesses of the layers (including a minimum thickness of the substrate 110a, the cathode 130a, the anode 140a, the electrolyte 120a, and the biocompatible protective layer 150a).

In some applications, it may desirable to provide a battery that has a thickness that is less than a specified maximum thickness. For example, in the case of a battery that is to be included in an eye-mountable device, it may be desirable for the battery to have a thickness less than a fraction of the thickness of the eye-mountable device. In some instances, the application-specific maximum thickness could be less than the minimum overall thickness of a battery fabricated from layers formed atop a parallel substantially planar substrate as described above. In such instances, a different battery configuration could be used, for example, as illustrated in FIGS. 1B-D and described below.

Figure 1B:
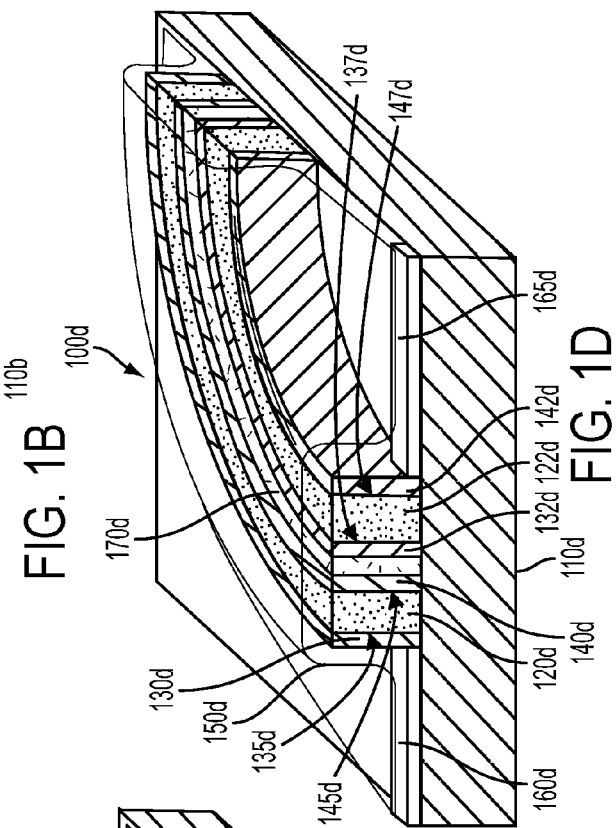
Figure 1C:
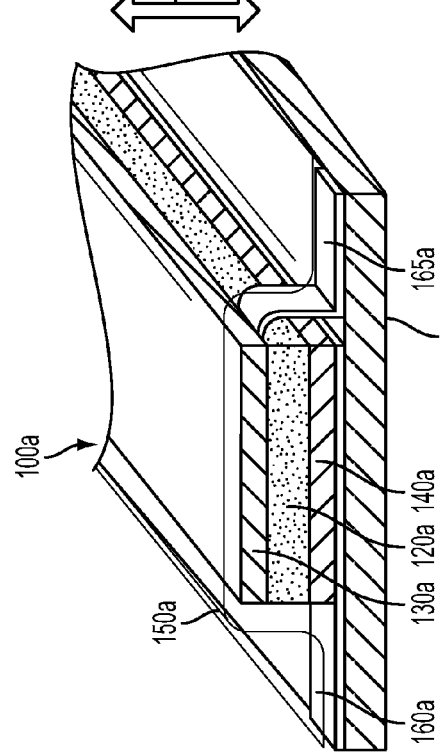
Figure 1D:
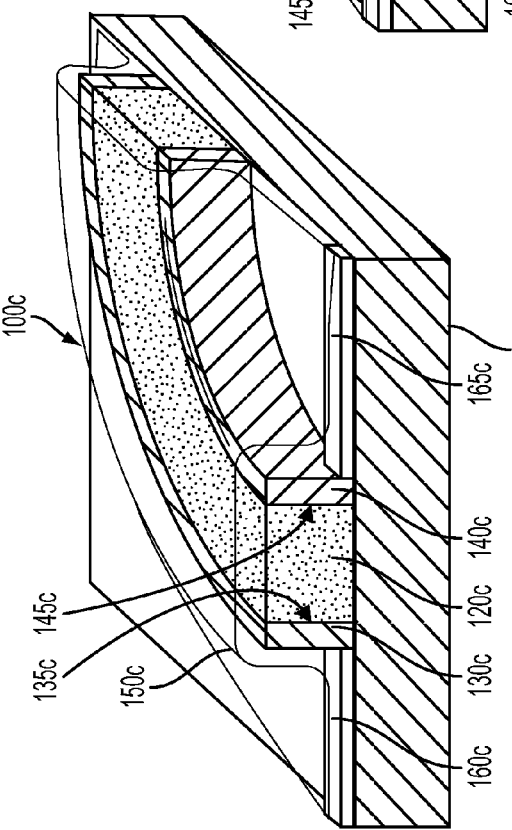

FIG. 1B illustrates in cross section an example electrochemical battery 100b that could be fabricated by disposing, on a substantially planar substrate 110b, an electrolyte 120b having a first surface 135b and a second surface 145b extending from the substrate 110b. The second surface 145b could be opposite the first surface 135b. The battery could additionally include a cathode 130b that is in contact with the first surface 135b of the electrolyte 120b, an anode 140b that is in contact with the second surface 145b of the electrolyte 120b, and a biocompatible protective layer 150b. With this configuration, cathode 130b and anode 140b are non-overlapping over 110b. The battery 100b could be electronically coupled to other components by interconnects 160b, 165b.

The anode 140b, electrolyte 120b, and cathode 130b could have minimum widths (defined as a measurement in the horizontal direction 180b). As the widths of the anode 140b, electrolyte 120b, and cathode 130b are perpendicular to the overall thickness of the battery 100b (the overall thickness of the battery 100b being defined as a measurement in the vertical direction 170b), the battery 100b can have a minimum overall thickness that is not constrained by the minimum widths of the anode 140b, electrolyte 120b, and cathode 130b. The overall thickness of the battery 100b is instead defined by respective thicknesses of the substrate 110b, the biocompatible protective layer 150b, and a thickest portion (defined in the vertical direction 170b) of the anode 140b, electrolyte 120b, and cathode 130b between the substrate 110b and the biocompatible protective layer 150b.

The thickest portion of the anode 140b, electrolyte 120b, and cathode 130b between the substrate 110b and the biocompatible protective layer 150b could be chosen such that the overall thickness of the battery is less than a maximum thickness (e.g., 50 microns) according to an application. The energy capacity of the battery 100b could be increased by increasing the area of the first surface 135b and/or second surface 145b while keeping the thickest portion of the anode 140b, electrolyte 120b, and cathode 130b between the substrate 110b and the biocompatible protective layer 150b below a chosen maximum according to an application.

A biocompatible protective layer (e.g., biocompatible layer 150b in battery 100b) could be configured to prevent the environment of a battery from degrading the function of the battery. For example, an electrolyte of the battery could be degraded by moisture or other elements in the environment of the battery. The biocompatible protective layer could be disposed to cover the electrolyte and at least portions of an anode and a cathode of the battery adjacent to the electrolyte such that the biocompatible protective layer formed a barrier that prevented moisture or other elements of the environment from interacting with and/or degrading the electrolyte. For example, the biocompatible protective layer could be a layer of parylene deposited onto the substrate, anode, cathode, and/or electrolyte and cured to form a biocompatible moisture barrier.

A biocompatible protective layer covering part or all of a battery could be configured to be in some way biocompatible. That is, the biocompatible protective layer could be composed of a material and/or include a surface treatment or coating such that it was able to be disposed in a biological environment for a period of time without substantially negatively impacting the function of biological structures in the biological environment. For example, the biocompatible protective layer could be configured such that, when a battery or other object partially or wholly covered by the biocompatible protective layer was implanted in biological tissue, the biological tissue was substantially able to continue functioning despite the presence of the battery or other device implanted in the biological tissue. In some examples, the biocompatible protective layer could be configured such that, when a battery or other object partially or wholly covered by the biocompatible protective layer was disposed on an eye, the eye was substantially able to continue functioning and the eye exhibited substantially no allergic or inflammatory response to the presence of the battery or other object on the eye.

A substrate (e.g., substrate 110b in battery 100b) can be used to provide support for a battery, to integrate the battery into a device, and/or to provide a structure during fabrication of the battery. The substrate could be a material capable of withstanding high temperatures, high pressures, oxidizing environments, or other conditions associated with fabrication or operation of the battery. The substrate material could be chosen such that other aspects of a device including the battery (for example, electronics) could be formed on the substrate at the same time as or at a different time than the formation of an anode, a cathode, an electrolyte, and/or a biocompatible protective layer of the battery on the substrate. The substrate material could be chosen such that fabrication of the battery could be achieved using techniques and processes used for fabrication of integrated circuit devices. The substrate material could be glass, silicon, diamond, silicon carbide, or some other material according to an application. The substrate material could extend beyond components of the battery (e.g., anode, cathode, and electrolyte) or could only be large enough to underlay the components of the battery.

An electrolyte of a battery could include a variety of chemicals or combinations of chemicals configured in a variety of ways. The electrolyte could include amorphous, crystalline, polycrystalline, and/or polymeric solid or gel components. The electrolyte also could include liquid components. The electrolyte could include organic and/or inorganic salts, metallic or nonmetallic ions, solvents, dissolved gases. Some components (e.g., salts) could be dissolved or otherwise incorporated in other components of the electrolyte (e.g., a flexible lattice of a gel polymer, a solid polymer, or a ceramic). In one example, the electrolyte is a gel electrolyte and the gel electrolyte includes polyacrylonitrile, propylene carbonate, ethylene carbonate, and zinc trifluoromethane sulfonate. However, other electrolyte chemistries and configurations could be used as well.

The configuration of electrodes (e.g., a cathode and an anode) of a battery could be related to the composition of an electrolyte of the battery. For example, a surface of a cathode in contact with a first surface of an electrolyte containing zinc trifluoromethane sulfonate could include manganese oxide. The cathode could be wholly composed of manganese oxide, or could only be composed of manganese oxide on the surface in contact with the first surface of the electrolyte (deposited on another metal comprising the remainder of the anode, or an oxide formed on a manganese-metal surface of the cathode through an oxidizing step). For example, a surface of an anode in contact with a second surface of an electrolyte containing zinc trifluoromethane sulfonate could include zinc metal. The anode could be wholly composed of zinc metal, or could only be composed of zinc metal on the surface in contact with the second surface of the electrolyte (deposited on another metal comprising the remainder of the anode, or a zinc foil formed on the remainder of the anode). The geometry of a battery could be related to the configuration of electrodes and an electrolyte of the battery. For example, the electrolyte could include zinc trifluoromethane sulfonate, a surface of the cathode in contact with a first surface of the electrolyte could include manganese oxide, a surface of the anode in contact with a second surface of the electrolyte could include zinc metal, and the first and second surfaces of the electrolyte could be less than about 100 microns apart. A distance between a first surface of an electrolyte and a second surface of an electrolyte could be chosen to maximize an energy capacity of a battery, to maximize a power capacity of a battery, or to optimize other properties or combinations of properties of a battery according to an application.

A battery could assume many shapes while including an electrolyte having first and second surfaces extending from a substantially planar substrate, a non-overlapping cathode and anode in contact with the first and second surfaces, respectively, and a biocompatible protective layer. FIG. 1B illustrates an example battery 100b that has an electrolyte 120b that is disposed as a substantially straight shape such that the first and second surfaces 135b, 145b are substantially planar. FIG. 1C is a cross-sectional illustration of an example electrochemical battery 100c that includes a substantially planar substrate 110c and an electrolyte 120c having a first surface 135c and a second surface 145c extending from the substrate 110c. The second surface 145c is opposite the first surface 135c. The electrolyte 120c has a curved shape such that the first and second surfaces 135c, 145c are curved surfaces. The battery additionally includes a cathode 130c (that is in contact with the first surface 135c of the electrolyte 120c), an anode 140c (that does not overlap the cathode 130c and that is in contact with the second surface 145c of the electrolyte 120c), and a biocompatible protective layer 150c. The battery 100c could be electronically coupled to other components by interconnects 160c, 165c.

Other embodiments of electrochemical batteries could have electrolytes with different shapes and concomitant shapes of first and second surfaces according to an application. In some examples, the electrolyte could have a closed shape. For example, the electrolyte could form a closed loop or ellipse. Additionally or alternatively, the electrolyte could have a spiral, branching, and/or space-filling shape. Thus, the electrolyte could have multiple 'first surfaces' and multiple 'second surfaces' such that first and second surfaces are locally substantially opposite. Additional configurations of an electrochemical battery are anticipated.

An electrochemical battery could include more than one electrochemical cell, where an electrochemical cell includes an electrolyte and a cathode and an anode in contact with surfaces of the electrolyte. FIG. 1D is a cross-sectional illustration of an example electrochemical battery 100d that includes a substantially planar substrate 110d and a first cell that includes a first electrolyte 120d having a first surface 135d and a second surface 145d extending from the substrate 110d. The second surface 145d is opposite the first surface 135d. The first electrolyte 120d has a curved shape such that the first and second surfaces 135d, 145d are curved surfaces. The first cell additionally includes a first cathode 130d (that is in contact with the first surface 135d of the first electrolyte 120d), and a first anode 140d (that does not overlap the first cathode 130d and that is in contact with the second surface 145d of the first electrolyte 120d). The battery 100d further includes a second cell that includes a second electrolyte 122d having a first surface 137d and a second surface 147d extending from the substrate 110d. The second surface 147d is opposite the first surface 137d. The second electrolyte 122d has a curved shape such that the first and second surfaces 137d, 147d are curved surfaces. The second cell additionally includes a second cathode 132d (that is in contact with the first surface 137d of the second electrolyte 122d), and a second anode 142d (that does not overlap the second cathode 132d and that is in contact with the second surface 145d of the second electrolyte 122d). The anode 140d of the first cell and the cathode 132d of the second cell are separated by a barrier 170d. The battery 100d additionally includes a biocompatible protective layer 150d that covers the first and second electrolytes 120d, 122d and at least portions of the first and second cathodes 130d, 132d and first and second anodes 140d, 142d. The battery 100d could be electronically coupled to other components by interconnects 160d, 165d.

The arrangement, shape, and number of cells in the example battery 100d are meant as illustrative, non-limiting examples. It is anticipated that a battery could include more than two cells. The shape of the cells could be straight, curved, branching, looped, or some other configuration. The cells of a battery could be configured to be roughly parallel (as in the example battery 100d) or could be arranged relative to each other in other ways. The cells could be similarly configured (e.g., similar anode materials, similar cathode materials, similar electrolyte composition, similar electrolyte height, similar cathode-anode separation distance) or could be differently configured according to an application. For example, a first cell of a battery could be configured to provide high energy capacity but low power capacity. A second cell of the battery could be differently configured to provide high power capacity but low energy capacity.

Cells of an electrochemical battery could be electrically interconnected in a variety of ways. For example, the barrier 170d of the example battery 100d could be a conductor, such that the first anode 140d of the first cell of the battery 100d is electrically connected to the second cathode 132d of the second cell of the battery 100d. The cells of the battery 100d could be described as being connected in series in this example. A voltage produced by the battery 100d between the first cathode 130d and the second anode 142d (which could be accessed using interconnects 160d, 162d) could correspond to the sum of respective voltages produced by the first and second cells of the battery 100d. Alternatively, the cells could be connected some other way. For example, the barrier 170d could include an electrical insulator, the first and second cathodes 130d, 132d could be electrically connected, and the first and second anodes 140d, 142d could be electrically connected. The cells of the battery 100d could be described as being connected in parallel in this example. A current capacity of the battery 100d could correspond to the sum of respective current capacities of the first and second cells of the battery 100d. Other interconnections between electrochemical cells are possible as well.

Individual cells or sets of cells of an electrochemical battery could be operated in series, in parallel, or according to some other configuration. Individual cells or sets of cells of an electrochemical battery could additionally or alternatively be operated (e.g., recharged, discharged) individually. For example, individual cells of a battery could be individually recharged and/or discharged according to a wear leveling algorithm, a load balancing algorithm, or some other application.

II. Example Batteries

In some embodiments, an electrochemical battery includes a substantially planar substrate, an electrolyte disposed on the substrate having opposite first and second surfaces that extend from the substrate, a cathode disposed on the substrate and in contact with the first surface of the electrolyte, an anode disposed on the substrate and in contact with the second surface of the electrolyte, and a biocompatible protective layer that covers the electrolyte and at least portions of the cathode and anode. A wide variety of compositions and configurations of the substrate, electrode, anode, cathode, and biocompatible protective layer are possible. Such a battery could be disposed in a variety of systems or devices according to a variety of applications.

FIG. 2A illustrates an example electrochemical battery 200a. The battery 200a includes a substantially planar substrate 210a, an electrolyte 220a disposed on the substrate 210a, a cathode 230a disposed on the substrate 210a, an anode 240a disposed on the substrate 210a, and a biocompatible protective layer 250a disposed to cover the electrolyte 220a and at least a portion of both the cathode 230a and the anode 240a. The electrolyte 220a has a first surface 235a and a second surface 245a extending from the substrate 210a. The second surface 245a is opposite the first surface 235a. The cathode 230a is in contact with the first surface 235a of the electrolyte 220a and the anode 240a does not overlap the cathode 230a and is in contact with the second surface 245a of the electrolyte 220a.

In the example battery 200a of FIG. 2A, the substrate 210a extends only as far as the extent of the overlaying electrolyte 220a, cathode 230a, and anode 240a. However, it is possible for a substrate of an electrochemical battery to extend beyond the extent of electrolytes, cathodes, anodes, and/or biocompatible protective layers disposed on the substrate. For example, the substrate could include extensions configured to allow the battery to be mounted on or in another device. For example, the substrate could include tabs or holes for mounting the battery using adhesives, bolts, tabs, pins, or other methods.

The anode and cathode of an electrochemical battery, for example battery 200a, could be electrically connected to some other system by a variety of methods. Exposed areas of both the anode and cathode could be configured such that electrical connections could be made to them. For example, the exposed areas could be configured such that and electrical connection could be welded, soldered, press-fit, spring-loaded, or otherwise connected to the anode and/or cathode. Additionally or alternatively, the substrate could include electrical traces, connections, or wires configured to electrically connect to the anode and cathode and to facilitate the electrical connection of the anode and cathode to other devices or systems. The other devices or systems could include electronics disposed, deposited, and/or formed on the substrate before, during, or after the formation of the anode, cathode, electrolyte, and/or biocompatible protective layer on the substrate.

As shown in FIG. 2A, the biocompatible protective layer 250a is disposed to cover the electrolyte 220a and at least a portion of both the cathode 230a and the anode 240a. In the example of FIG. 2A, this includes the biocompatible protective layer 250a covering surfaces of the electrolyte 220a that are not covered by the substrate 210a, the cathode 230a or the anode 240a (i.e., a front surface 225a, a top surface 227a, and a back surface (not shown)) and a portion of surfaces of the anode 240a, cathode 230a, and substrate 210a that are adjacent to the uncovered surfaces of the electrolyte 120a (i.e., the front surface 225a, the top surface 227a, and the back surface).

This disposition of a biocompatible protective layer of a battery is meant as an exemplary embodiment and is not meant to be limiting. A biocompatible protective layer could be disposed to completely cover a battery (covering all exposed surfaces of an anode, a cathode, and a substrate in addition to exposed surfaces of the electrolyte). In some examples, additional components (e.g., electronics, a second electrolyte layer, conductive traces) could be disposed on a substrate, and the biocompatible protective layer could be disposed to partially or completely cover some or all of the additional components disposed on the substrate. An adhesion promoter (e.g., a silane) could be disposed on metal components of a battery to enhance the adhesion of components of a biocompatible protective layer to the metal components. Additionally or alternatively, a battery (including a substrate, an electrolyte, an anode and a cathode) could be disposed on some other base material. A biocompatible protective layer could then be disposed to cover the electrolyte, at least portions of the anode and the cathode, and all or part of the base material and/or any other components (e.g., electronics, conductive traces) disposed on the base material.

An electrochemical battery, like the battery 200a illustrated in FIG. 2A, could be described as containing cells. A cell could include an electrolyte, a cathode in contact with the electrolyte, and an anode in contact with the electrolyte and not in contact with the cathode. The battery 200a illustrated in FIG. 2A includes one cell. The one cell of the battery 200a includes the electrolyte 220a, the cathode 230a, and the anode 240a. An electrochemical battery could contain one cell or more than one cell. Further, the more than one anode and more than one cathode of the more than one cells could be electrically connected to each other and to other systems or devices in a variety of ways.

FIG. 2B illustrates an example electrochemical battery 200b that includes three cells. The battery 200b includes a substantially planar substrate 210b, a first cell (including a first electrolyte 220b, a first cathode 230b, and a first anode 240b all disposed on the substrate 210b), a second cell (including a second electrolyte 222b, a second cathode 232b, and a second anode 242b all disposed on the substrate 210b), and a third cell (including a third electrolyte 224b, a third cathode 234b, and a third anode 244b all disposed on the substrate 210b). The electrolytes 230b, 232b, 234b have respective first surfaces 235b, 237b, 239b and second surfaces 245b, 247b, 249b extending from the substrate 210b with respective second surfaces 245b, 247b, 249b being opposite respective first surfaces 235b, 237b, 239b. Respective cathodes 230b, 232, 234b are in contact with respective first surfaces 235b, 237b, 239b and respective anodes 240b, 242b, 244b are in contact with respective second surfaces 245b, 247b, 249b. The battery 200b includes barriers 270b, 272b that are disposed between the first and second cells and between the second and third cells, respectively. The battery 200b further includes a biocompatible protective layer 250b disposed to cover the electrolytes 220b, 222b, 224b and at least a portion of both the cathodes 230b, 232b, 234b and the anodes 240b, 242b, 244b.

The cells of the battery 200b could be connected to each other and to other systems or devices in various ways according to an application. In some examples, the barriers 270b, 272b could include conductors, such that the cells could be described as being connected in series. In such examples, a voltage could appear between the first cathode 230b and the third anode 244b corresponding to the sum of the voltages produced by the three cells of the battery 200b. In some examples, one or both of the barriers 270b, 272b could include insulators, and the three cells could be electrically connected in parallel. Other connections of the cells to each other and to other systems or devices are anticipated.

While the example batteries 200a, 200b illustrate example electrolytes having substantially straight shapes, other configurations of electrolytes, anodes, cathodes, substrates, and biocompatible protective layers are anticipated. For example, the one or more electrolytes could be curved shapes, closed loops, branching structures, space-filling curves, angular shapes, and/or other configurations according to an application.

FIG. 2C illustrates an example electrochemical battery 200c that includes an electrolyte 220c configured to have an angled spiral shape. The battery 200c includes a substantially planar substrate 210c, the electrolyte 220c disposed on the substrate 210c, a cathode 230c disposed on the substrate 210c, an anode 240c disposed on the substrate 210c, a barrier 270c, and a biocompatible protective layer 250c disposed to cover the electrolyte 220c and at least a portion of both the cathode 230c and the anode 240c. The electrolyte 220c has a first surface 235c and a second surface 245c extending from the substrate 210c. The second surface 245c is opposite the first surface 235c. The cathode 230c is in contact with the first surface 235c of the electrolyte 220c and the anode 240c does not overlap the cathode 230c and is in contact with the second surface 245c of the electrolyte 220c.

Note that the distance between an example point on the first surface 235c and an opposite point on the second surface 245c is not constant for the example angled spiral shaped battery 200c illustrated in FIG. 2C. For example, the distance between a point on the first surface 235c that is on one of the corners of the first surface 235c and an opposite point on an opposite corner of the second surface 245c could be greater than the distance between other sets of corresponding opposite points on the first and second surfaces 235c, 245c. Other angled electrolytes or electrolytes having other shapes could have similarly varying distances between points on a first surface of the electrolyte and corresponding points on an opposite second surface of the electrolyte.

An electrolyte could be configured to have an angled spiral shape to increase a volume of electrolyte, an area of a first and/or second surface of the electrolyte, to increase an energy or a current capacity of a battery, or to optimize some other factor. For example, the battery 200c of FIG. 2C could have been configured with an angled spiral shape to attain an increased energy capacity while having a substrate size and shape equal to the size and shape of the substrate 210c. Other motivations or design considerations are anticipated according to an application. Further, an electrochemical battery having a first electrolyte configured to have an angled spiral shape could include multiple electrolytes (and corresponding anodes, cathodes, and first and second surfaces) that could be disposed adjacent to the first electrolyte such that the electrolytes form a multiple spiral or some other interlocking shape or shapes.

FIG. 2D illustrates an example electrochemical battery 200d having an electrolyte 220d configured as a closed loop. The battery 200d includes a substantially planar substrate 210d, the electrolyte 220d disposed on the substrate 210d, a cathode 230d disposed on the substrate 210d, an anode 240d disposed on the substrate 210d, and a biocompatible protective layer 250c disposed to cover the electrolyte 220d and at least a portion of both the cathode 230d and the anode 240d. The electrolyte 220d has a first surface 235d and a second surface 245d extending from the substrate 210d. The second surface 245d is opposite the first surface 235d. The cathode 230d is in contact with the first surface 235d of the electrolyte 220d and the anode 240d does not overlap the cathode 230d and is in contact with the second surface 245c of the electrolyte 220d.

The battery 200d is meant as a non-limiting example embodiment of an electrochemical battery having a single electrolyte configured as a closed loop. An electrochemical battery could include multiple electrolytes (and corresponding anodes, cathodes, and first and second surfaces extending from the substrate) configured as a closed loop and/or electrolytes not configured as closed loop. Further, the example substrate 210d is configured to have a hole corresponding to the middle of the closed loop; in other embodiments, the hole could be closed and/or the substrate could be configured to have some other shape or size than a closed loop corresponding to the extent of the electrolyte, anode, and cathode disposed on the substrate.

FIG. 2E illustrates an example electrochemical battery 200e having an electrolyte 220e configured to have a spiral shape. The battery 200e includes a substantially planar substrate 210e, the electrolyte 220e disposed on the substrate 210e, a cathode 230e disposed on the substrate 210e, an anode 240e disposed on the substrate 210e, a barrier 270e, and a biocompatible protective layer 250e disposed to cover the electrolyte 220e and at least a portion of both the cathode 230e and the anode 240e. The electrolyte 220e has a first surface 235e and a second surface 245e extending from the substrate 210e. The second surface 245e is opposite the first surface 235e. The cathode 230e is in contact with the first surface 235d of the electrolyte 220e and the anode 240e does not overlap the cathode 230e and is in contact with the second surface 245e of the electrolyte 220e.

The battery 200e is meant as a non-limiting example embodiment of an electrochemical battery having a single electrolyte configured as a spiral. An electrochemical battery could include multiple electrolytes (and multiple corresponding anodes, cathodes, and first and second surfaces extending from the substrate) configured as spirals and/or electrolytes not configured as spirals. Batteries including multiple electrolytes configured as spirals could have the electrolytes configured such that the electrolytes form a multiple spiral or some other interlocking shape or shapes. Further, the example substrate 210e is configured to have a hole corresponding to the open middle of the spiral; in other embodiments, the hole could be closed and/or the substrate could be configured to have some other shape or size than a closed shape corresponding to the extent of the electrolyte, anode, and cathode disposed on the substrate.

An electrochemical battery could include an electrolyte, an anode, a cathode, and/or some other elements configured in a variety of ways according to an application. An electrolyte could include a variety of chemicals. The configuration of different elements of the battery could be inter-related; for example, an anode being configured to include zinc metal could be related to an electrolyte containing a zinc salt. Further, the size, shape, distance between elements, or other aspects of a battery could be inter-related and/or related to the composition of the electrolyte, anode, cathode, and/or other components of the battery. In some examples (e.g., the batteries illustrated in FIGS. 2A-2E), a battery could include a gel electrolyte that includes poly-acrylonitrile, propylene carbonate, ethylene carbonate, and zinc trifluoromethane sulfonate, an anode that includes zinc metal on a surface of the anode in contact with the electrolyte, and a cathode that include manganese oxide on a surface of the cathode in contact with the electrolyte. Further, first and second surfaces of the electrolyte could be generally separated by a distance of about 100 microns. In examples where the electrolyte has a more complicated shape (e.g., batteries 200c, 200d, 200e illustrated in FIGS. 2C-2E) this could mean that the separation between the first and second surfaces of the electrolyte could have a range of values. This distance limit could be determined based on a diffusion rate within the electrolyte or some other consideration according to an application.

An electrochemical battery configured as described herein could be incorporated in a variety devices or systems and operated according to a variety of applications. Such batteries could be incorporated into wholly or partially battery-powered devices to power the devices. The devices could be implantable devices and/or devices designed to interface in some way with a body. For example, such batteries could be incorporated into thin devices configured to be mounted onto an eye, a tooth, or some other surface of a body to measure some property of the body and/or to interact with the body. The device could be configured to be powered by a battery to apply a treatment or pharmaceutical to a body. Such batteries could be incorporated into some other thin device. For example, a battery could be incorporated into a thin adhesive sensor patch or some other device configured to unobtrusively mount onto a surface and perform some function. Such batteries could be used to power a device having the size and shape of a credit card, a business card, or some other substantially planar device. A battery could have a rechargeable chemistry, and could be operated to alternatively power a device and to be recharged. A battery could be a primary battery such that it was not able to be recharged.

III. Example Body-Mountable Device

Figure 3A:
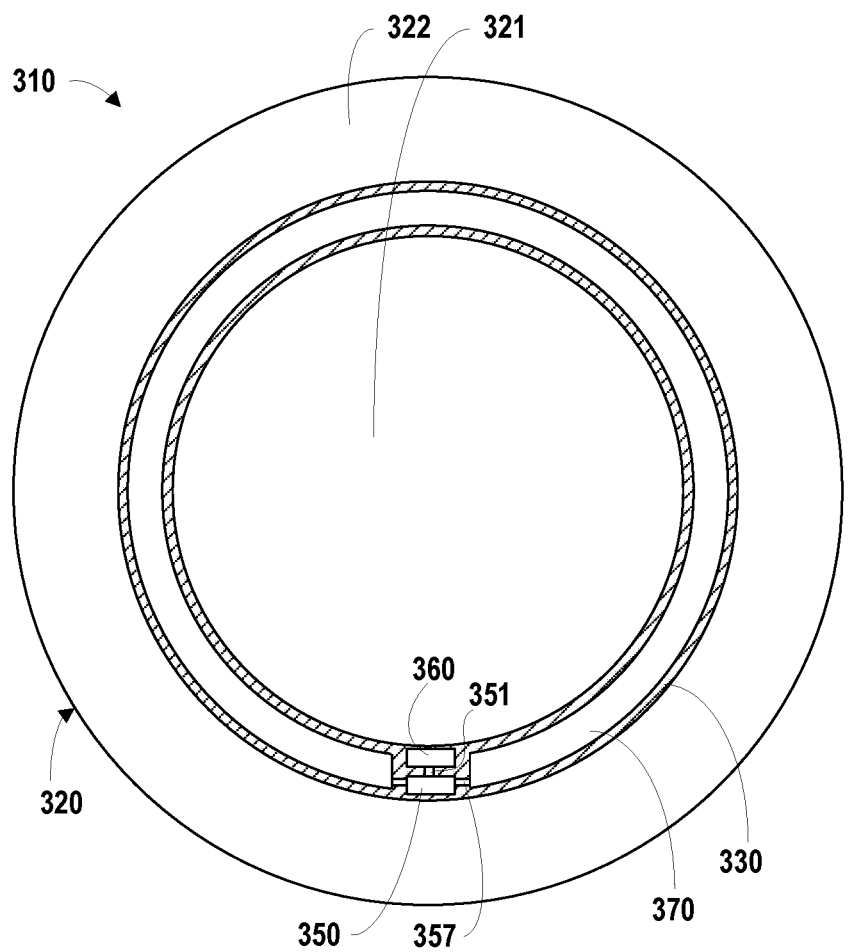
FIG. 3A is a bottom view of an example eye-mountable device.
Figure 3B:
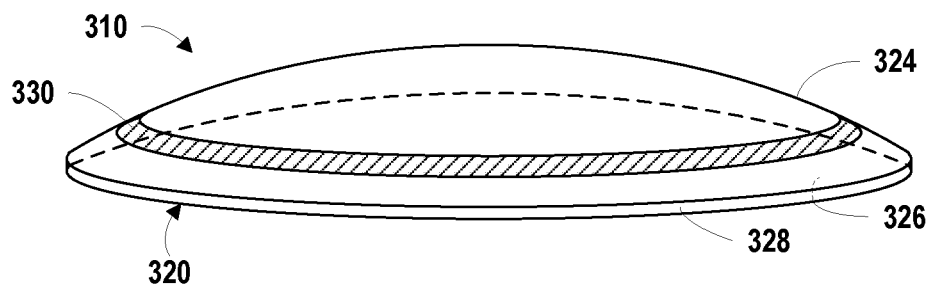
FIG. 3B is an aspect view of the example eye-mountable device shown in FIG. 3A.

FIG. 3A is a bottom view of an example body-mountable device 310. FIG. 3B is an aspect view of the example body-mountable device 310 shown in FIG. 3A. It is noted that relative dimensions in FIGS. 3A and 3B are not necessarily to scale, but have been rendered for purposes of explanation only in describing the arrangement of the example body-mountable device 310. The body-mountable device 310 is formed of a polymeric material 320 shaped as a curved disk. A battery 360 is embedded within the polymeric material 320 of the body-mountable device 310. In the example body-mountable device 310 the polymeric material 320 is shaped to be mounted to an eye of a wearer of the body-mountable device 310. The polymeric material 320 can be a substantially transparent material to allow incident light to be transmitted to an eye while the body-mountable device 310 is mounted to the eye. The polymeric material 320 can be a biocompatible material similar to those employed to form vision correction and/or cosmetic contact lenses in optometry, such as polyethylene terephthalate ("PET"), polymethyl methacrylate ("PMMA"), silicone hydrogels, combinations of these, etc. The polymeric material 320 can be formed with one side having a concave surface 326 suitable to fit over a corneal surface of an eye. The opposing side of the disk can have a convex surface 324 that does not interfere with eyelid motion while the eye-mountable device 310 is mounted to the eye. A circular outer side edge 328 connects the concave surface 324 and convex surface 326.

The body-mountable device 310 can have dimensions similar to vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of the body-mountable device 310 can be selected according to the size and/or shape of the corneal surface of the wearer's eye.

The polymeric material 320 can be formed with a curved shape in a variety of ways. For example, techniques similar to those employed to form vision-correction contact lenses, such as heat molding, injection molding, spin casting, etc. can be employed to form the polymeric material 320. While the body-mountable device 310 is mounted in an eye, the convex surface 324 faces outward to the ambient environment while the concave surface 326 faces inward, toward the corneal surface. The convex surface 324 can therefore be considered an outer, top surface of the eye-mountable device 310 whereas the concave surface 326 can be considered an inner, bottom surface. The "bottom" view shown in FIG. 3A is facing the concave surface 326. From the bottom view shown in FIG. 3A, the outer periphery 322, near the outer circumference of the curved disk is curved out of the page, whereas the center region 321, near the center of the disk is curved in to the page.

A base 330 is embedded in the polymeric material 320. The base 330 can be embedded to be situated along the outer periphery 322 of the polymeric material 320, away from the center region 321. The base 330 does not interfere with vision because it is too close to the eye to be in focus and is positioned away from the center region 321 where incident light is transmitted to the eye-sensing portions of the eye. Moreover, the base 330 can be formed of a transparent material to further mitigate any effects on visual perception.

The base 330 can be shaped as a flat, circular ring (e.g., a disk with a central hole). The flat surface of the base 330 (e.g., along the radial width) is a platform for mounting a battery 360 and/or for mounting electronics such as chips (e.g., via flip-chip mounting) and for patterning conductive materials (e.g., via deposition techniques) to form electrodes, antenna(e), and/or connections. The base 330 and the polymeric material 320 can be approximately cylindrically symmetric about a common central axis. The base 330 can have, for example, a diameter of about 10 millimeters, a radial width of about 1 millimeter (e.g., an outer radius 1 millimeter greater than an inner radius), and a thickness of about 50 micrometers. However, these dimensions are provided for example purposes only, and in no way limit the present disclosure. The base 330 can be implemented in a variety of different form factors.

A loop antenna 370, controller 350, and battery 360 are disposed on the embedded base 330. The controller 350 can be a chip including logic elements configured to operate the loop antenna 370 and to be at least partially powered by the battery 360. The controller 350 could also be configured to recharge the battery 360. The controller 350 is electrically connected to the loop antenna 370 by interconnects 357 also situated on the base 330. Similarly, the controller 350 is electrically connected to the battery 360 by an interconnect 351. The interconnects 351, 357, the loop antenna 370, and any conductive electrodes (e.g., for an electrochemical analyte sensor, a charging port, etc.) can be formed from conductive materials patterned on the base 330 by a process for precisely patterning such materials, such as deposition, lithography, etc. The conductive materials patterned on the base 330 can be, for example, gold, platinum, palladium, titanium, carbon, aluminum, copper, silver, silver-chloride, conductors formed from noble materials, metals, combinations of these, etc.

As shown in FIG. 3A, which is a top view of the body-mountable device 310, the battery 360 is mounted to a side of the base 330 facing the concave surface 326. However, the battery, electronics, other components, etc. situated on the base 330 can be mounted to either the "inward" facing side (e.g., situated closest to the concave surface 326) or the "outward" facing side (e.g., situated closest to the convex surface 324). Moreover, in some embodiments, some components can be mounted and/or patterned on one side of the base 330, while other components are mounted and/or patterned on the opposing side, and connections between the two can be made via conductive materials passing through the base 330.

The loop antenna 370 can be a layer of conductive material patterned along the flat surface of the substrate to form a flat conductive ring. In some instances, the loop antenna 370 can be formed without making a complete loop. For instance, the antenna 370 can have a cutout to allow room for the controller 350 and battery 360, as illustrated in FIG. 3A. However, the loop antenna 370 can also be arranged as a continuous strip of conductive material that wraps entirely around the flat surface of the base 330 one or more times. For example, a strip of conductive material with multiple windings can be patterned on the side of the base 330 opposite the controller 350 and battery 360. Interconnects between the ends of such a wound antenna (e.g., the antenna leads) can be passed through the base 330 to the controller 350.

FIG. 3C is a side cross-section view of the example body-mountable device 310 while mounted to a corneal surface 22 of an eye 10. FIG. 3D is a close-in side cross-section view enhanced to show the tear film layers 40, 42 surrounding the exposed surfaces 324, 326 of the example body-mountable device 310. FIG. 3D additionally shows the configuration of the battery 360 including a substrate 361, electrolyte 362, anode 364, cathode 366, and biocompatible protective layer 368. It is noted that relative dimensions in FIGS. 3C and 3D are not necessarily to scale, but have been rendered for purposes of explanation only in describing the arrangement of the example body-mountable device 310.

For example, the total thickness of the body-mountable device 310 can be about 200 micrometers, while the thickness of the tear film layers 40, 42 can each be about 10 micrometers, although this ratio may not be reflected in the drawings. Further, the battery 360 can have an overall thickness (defined by respective thicknesses of the substrate 361, the biocompatible protective layer 368, and a thickest portion of the electrolyte 362, cathode 366, and anode 364 between the substrate 361 and the biocompatible protective layer 368) that is less than about 50 microns, although this measurement may not be reflected in the drawings. Some aspects are exaggerated to allow for illustration and facilitate explanation.

The eye 10 includes a cornea 20 that is covered by bringing the upper eyelid 30 and lower eyelid 32 together over the top of the eye 10. Incident light is received by the eye 10 through the cornea 20, where light is optically directed to light sensing elements of the eye 10 (e.g., rods and cones, etc.) to stimulate visual perception. The motion of the eyelids 30, 32 distributes a tear film across the exposed corneal surface 22 of the eye 10. The tear film is an aqueous solution secreted by the lacrimal gland to protect and lubricate the eye 10. When the body-mountable device 610 is mounted in the eye 10, the tear film coats both the concave and convex surfaces 324, 326 with an inner layer 40 (along the concave surface 326) and an outer layer 42 (along the convex layer 324). The tear film layers 40, 42 can be about 10 micrometers in thickness and together account for about 10 microliters.

The tear film layers 40, 42 are distributed across the corneal surface 22 and/or the convex surface 324 by motion of the eyelids 30, 32. For example, the eyelids 30, 32 raise and lower, respectively, to spread a small volume of tear film across the corneal surface 22 and/or the convex surface 324 of the body-mountable device 310. The tear film layer 40 on the corneal surface 22 also facilitates mounting the body-mountable device 310 by capillary forces between the concave surface 326 and the corneal surface 22. In some embodiments, the body-mountable device 310 can also be held over the eye in part by vacuum forces against corneal surface 22 due to the concave curvature of the eye-facing concave surface 326.

As shown in the cross-sectional views in FIGS. 3C and 3D, the base 330 can be inclined such that the flat mounting surfaces of the base 330 are approximately parallel to the adjacent portion of the concave surface 326. As described above, the base 330 is a flattened ring with an inward-facing surface 332 (closer to the concave surface 326 of the polymeric material 320) and an outward-facing surface 334 (closer to the convex surface 324). The base 330 can have batteries, electronic components, and/or patterned conductive materials mounted to either or both mounting surfaces 332, 334. As shown in FIG. 3D, the battery 360, controller 350, and conductive interconnect 351 are mounted on the outward-facing surface 334. However, in other examples, the battery 360 and/or other components may be mounted on the inward-facing surface 332 of the base 330.

The battery 360 includes a substantially planar substrate 361, an electrolyte 362 disposed on the substrate 361, a cathode 364 disposed on the substrate 361, an anode 366 disposed on the substrate 361, and a biocompatible protective layer 368 disposed to cover the electrolyte 362 and at least a portion of both the cathode 364 and the anode 366. The biocompatible protective layer 368 additionally covers other components disposed on the outward-facing surface 334 of the base 330 including the controller 360, the loop antenna 370 and the interconnects 351, 357. The electrolyte 362 has a first surface 363 and a second surface 365 extending from the substrate 361. The second surface 365 is opposite the first surface 363. The cathode 364 is in contact with the first surface 363 of the electrolyte 362 and the anode 366 does not overlap the cathode 364 and is in contact with the second surface 365 of the electrolyte 362.

The components of the battery 360 could be configured according to an application. In some examples, the substrate 361 could be glass, silicon, diamond, silicon carbide, or some other material. The biocompatible protective layer 368 could be configured to prevent the tear fluid of the eye from degrading the function of the battery. For example, the biocompatible protective layer could be a layer of parylene deposited onto the substrate, anode, cathode, and/or electrolyte and cured to form a biocompatible moisture barrier. Adhesion promoters could also be included in the biocompatible protective layer 368.

The electrolyte 362, cathode 364, and anode 366 could include various materials in various configurations such that the electrochemical battery 360 could provide power to the body-mountable device 310. For example, the electrolyte 362 could be a gel polymer, a liquid, a solid, a ceramic, or some other material. In some examples, the electrolyte 362 could be a gel polymer including polyacrylonitrile, propylene carbonate, ethylene carbonate, and zinc trifluoromethane sulfonate. In some examples, the anode 366 could include zinc metal on a surface of the anode 366 in contact with the electrolyte 362, and the cathode 364 could include manganese oxide on a surface of the cathode 364 in contact with the electrolyte 362. Further, first and second surfaces 363, 365 of the electrolyte 362 could be separated by a distance of about 100 microns.

In the illustrated example body-mountable device 310, the battery 360 is configured to be rectangular and the electrolyte 362 has first and second surfaces 363, 365 extending from the substrate 361 that are substantially planar. This is meant as a non-illustrative example only. A battery included in the body-mountable device 310 could be configured to have a variety of shapes. For example, the electrolyte could be curved shapes, closed loops, branching structures, space-filling curves, angular shapes, and/or other configurations according to an application. More than one battery could be disposed in the body-mountable device. One or more batteries could be mounted on either or both mounting surfaces 332, 334.

A battery disposed in the body-mountable device 310 could be configured to have a central hole or transparent region such that, when the battery was disposed in the body-mountable device 310 such that the hole or transparent region of the battery was overlapping with the center region 321, light could pass through the hole or transparent region of the battery, through the center region 321 of the body-mountable device 310, to the eye 10. In some examples, the body-mountable device could include a battery having an electrolyte configured as a closed loop (similar to the battery 200d illustrated in FIG. 2D) disposed on the base 330. In some examples, the body-mountable device could include a battery configured as an angled or smooth spiral (similar to the batteries 200C, 200e illustrated in FIGS. 2C and 2E). In some examples, the spiral could have an open and/or transparent center region and could be disposed on the base 330 such that the center region of the battery overlapped with the center region 321 of the body-mountable device 310. Other configurations of a battery encircling a central transparent region of a body-mountable device are anticipated.

An electrochemical battery included in the body-mountable device 310 could include more than one electrochemical cell. For example the battery could include a second electrolyte disposed on the substrate of the battery and having a first surface and a second surface extending from the substrate. The second surface could be opposite the first surface. The battery could additionally a second cathode disposed on the substrate (that is in contact with the first surface of the second electrolyte), and a second anode (that does not overlap the second cathode and that is in contact with the second surface of the second electrolyte). The biocompatible protective of the battery could additionally cover the second electrolyte and at least portions of the second cathode and the second anode. The battery could include more than two cells. Individual cells of the battery could be configured similarly (e.g., different cells could have electrolytes, cathodes, and/or anodes made of similar materials) or differently according to an application. Different cells of a battery could be connected to each other and to components of the body-mountable device 310 in a variety a ways (e.g., in parallel, in series) according to an application.

A battery included in a body-mountable device could be operated according to a variety of applications. In some examples, the battery could be used to power a controller, a sensor, a light emitter, or some other system of the body-mountable device. In some examples, some other power source in the body-mountable device (e.g., a solar cell, an RF energy receiving antenna) could partially power the body-mountable device at the same time as the battery. Additionally or alternatively, the battery could power the body-mountable device during some periods of time, while another power source could power the body-mountable device during other periods of time. For example, an RF energy receiving antenna could power the body-mountable device when the body-mountable device was proximate to a source of RF energy and the battery could power the body-mountable device when the body-mountable device was not proximate to a source of RF energy. The battery could be operated to provide backup power (e.g., to save information stored in a volatile memory or to maintain a diminished level of operation of the body-mountable device) when a primary source of power for the body-mountable device was not available.

A battery included in a body-mountable device could be configured to be rechargeable. Such a rechargeable battery could be alternatively discharged to power the body mountable device and recharged by the body-mountable device or some other system when another source of energy is available. The battery could be recharged using energy received using an RF energy receiving antenna, solar cell, or some other source disposed in the body-mountable device. Additionally or alternatively, the body-mountable device could be configured to receive energy for recharging a battery by direct physical contact with a recharging device. For example, the body-mountable device could include two or more electrical contacts configured to be in electrical contact with a power source such that the rechargeable battery could be recharged using power transmitted though the at least two electrical contacts.

A body-mountable device could include additional components that could be powered by the battery to perform some function. In some examples, the body-mountable device could include a chemical sensor. The chemical sensor could be configured to detect the presence and/or concentration of a chemical in an environment of the body-mountable device. For example, the body-mountable device could be configured to be mounted to a surface of an eye, and the chemical sensor could be configured to detect the concentration of a chemical in a tear fluid of the eye (for example, glucose). In some examples, the body-mountable device could contain light emitters or other means for controlling and/or emitting patterned energy. For example, the body-mountable device could be configured to be mounted to an eye, and the body-mountable device could include an array of light emitters and optics such that the body-mountable device could be operated to present a display image to the eye. Other components and applications of a body-mountable device are anticipated.

The example body-mountable devices of FIGS. 3A-3D illustrate example embodiments of body-mountable devices incorporating batteries configured to at least partially power components of the example body-mountable devices. The example embodiments are meant as non-limiting examples and other embodiments are anticipated. For example, body-mountable devices incorporating batteries could be configured to be mounted on a tooth, in a mouth, on a skin surface, or on some other accessible part of a body. A body-mountable device incorporating a battery could be configured such that it lacked one or more of the components included in the example body-mountable device 310 (e.g., the base 330, controller 350, the loop antenna 370, etc.). For example, a body-mountable device could contain only an electrochemical battery as disclosed herein and a simple electronic component electronically coupled to the battery (e.g., a light emitting diode, an iontophoretic chamber containing a charged pharmaceutical or other chemical, or some other component).

Moreover, it is particularly noted that while embodiments are described herein by way of example as a body-mountable device or an ophthalmic device including a battery embedded in a shaped polymeric material, the disclosed electrochemical battery therefore can be applied in other contexts as well. For example, electrochemical batteries disclosed herein may be included in wearable (e.g., body-mountable) and/or implantable devices. In some contexts, a battery is situated to be substantially encapsulated by biocompatible polymeric material suitable for being in contact with bodily fluids and/or for being implanted. In one example, a mouth-mountable device includes a battery and is configured to be mounted within an oral environment, such as adjacent a tooth or adhered to an inner mouth surface. In another example, an implantable medical device that includes a battery may be encapsulated in biocompatible material and implanted within a host organism. Such body-mounted and/or implanted devices can include circuitry configured to operate a light sensor and/or light emitter by providing power to the sensor and/or emitter from the battery and measuring a resulting current, voltage, or other electronic variable. The device can also include an energy harvesting system and a communication system for wirelessly indicating sensor results (e.g., measured current) and/or recharging the battery. In other examples, batteries disclosed herein may be included in wireless sensors which are not used to make measurements in or on a human body. For example, batteries disclosed herein may be included in body-mountable and/or implantable sensors used to measure a property of a fluid of an animal. In another example, batteries disclosed herein may be included in devices to measure a property of an environment, such as a river, lake, marsh, reservoir, water supply, sanitary sewer system, or storm sewer system. In another example, batteries disclosed herein may be included in devices to measure a property of a fluid which is part of a process, such as a waste treatment process, pharmaceutical synthesis process, food preparation process, fermentation process, or medical treatment process.

IV. Example Fabrication Method

Figure 4:
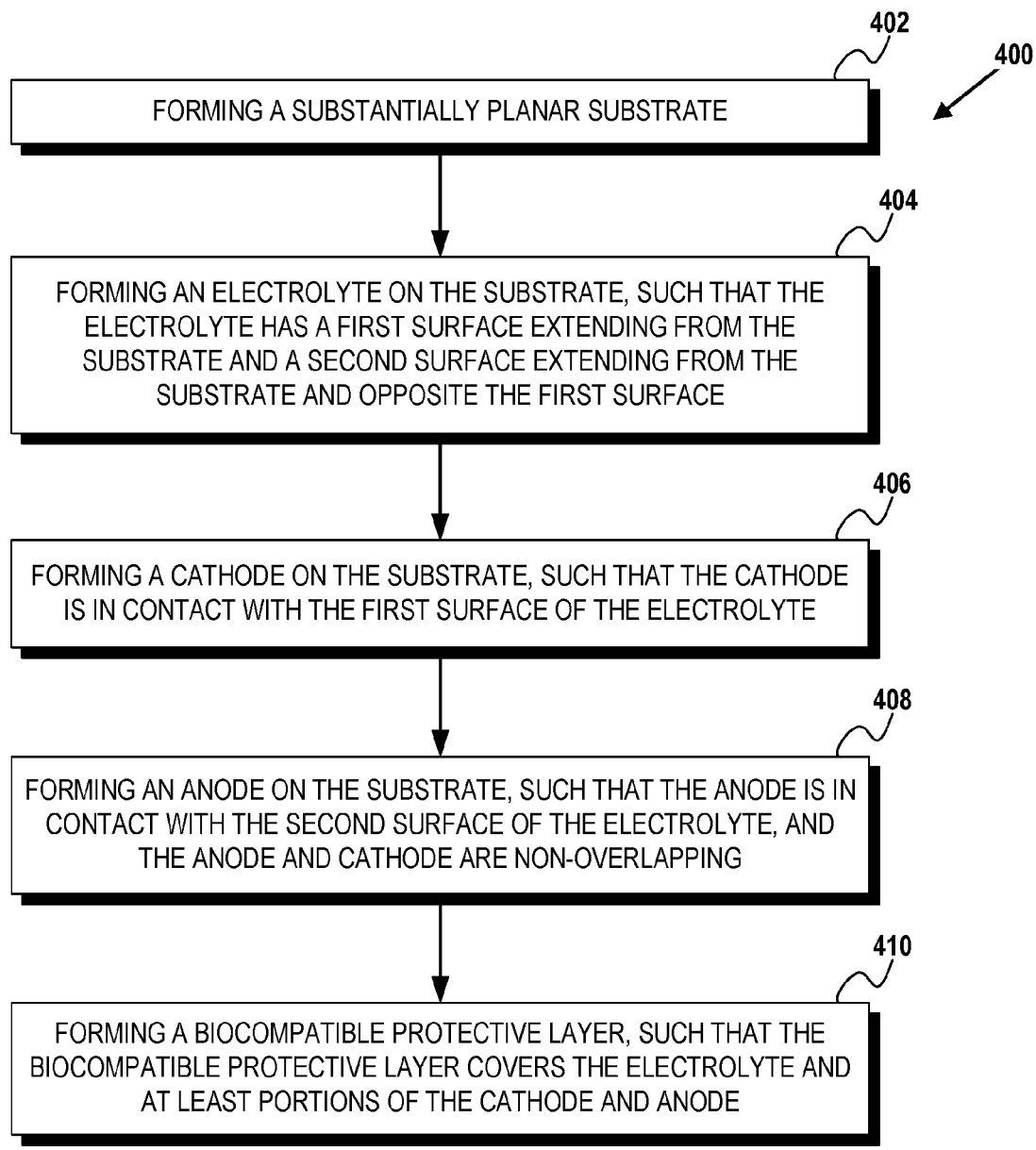
FIG. 4 is a flowchart of an example method.

FIG. 4 is a flowchart of an example process 400 for fabricating an electrochemical battery. A substantially planar substrate is formed (402) to provide a base structure for the fabrication of the device. The substrate material could be glass, silicon, diamond, silicon carbide, or some other material according to an application. The substrate could be formed by a variety of methods related to the substrate material. For example, the substrate could be formed through casting, machining, epitaxial crystal growth, CVD, PVD, polymerization, electroplating, or some other method.

An electrolyte is formed on the substrate, such that the electrolyte has a first surface extending from the substrate and a second surface extending form the substrate and opposite the first face (404). The formed electrolyte could include amorphous, crystalline, polycrystalline, and/or polymeric solid or gel components. The electrolyte could also include liquid components. The formed electrolyte could include organic and/or inorganic salts, metallic or nonmetallic ions, solvents, and/or dissolved gases. Some components (e.g., salts) could be dissolved in other components of the formed electrolyte (e.g., a flexible lattice of a gel polymer, a solid polymer, or a ceramic). In some examples, the formed electrolyte is a gel electrolyte and the gel electrolyte includes polyacrylonitrile, propylene carbonate, ethylene carbonate, and zinc trifluoromethane sulfonate. Other electrolyte chemistries and configurations could be used.

Forming the electrolyte could include forming the electrolyte to have a specified shape and/or size. In some examples, the formed electrolyte could have a closed shape. For example, the electrolyte could be formed as a closed loop or ellipse. Additionally or alternatively, the formed electrolyte could have a branching and/or space-filling shape, wherein the formed electrolyte could have multiple 'first surfaces' and multiple 'second surfaces' such that first and second surfaces are locally substantially opposite. The electrolyte could be formed to have some other shape or shapes. A feature of the formed electrolyte (e.g., a thickness of the electrolyte) could be specified to optimize an energy capacity, a power capacity, a current capacity, a cost, and/or some other factor or property of a battery formed in part by forming the electrolyte.

Forming the electrolyte could include a variety of processes or combinations of processes. For example, forming the electrolyte could include CVD, PVD, spin-casting, UV curing, heat curing, photopolymerization, chemically-initiated polymerization, adsorption, absorption, screen printing, inkjet printing, photolithography, or other methods. In some examples, forming the electrolyte could include forming a solid or a gel structure. In some examples, forming the electrolyte could include adding a component of the electrolyte to an already-formed component of the electrolyte. Other methods and combinations of methods are anticipated.

A cathode is formed on the substrate, such that the cathode is in contact with the first surface of the electrolyte (406). The formed cathode could include a variety of materials or combinations of materials. For example, the cathode could include metals, conductive polymers, crystals, nanotubes, nanomaterials, oxides, or other materials. For example, the cathode could include copper, zinc, lithium, aluminum, nickel, lead, iron, silver, gold, metal oxides, metal salts, metal alloys, doped polypyrrole, graphite, or some other material or materials. A cathode could be formed through a variety of methods or combinations of methods. For example, method of forming a cathode could include CVD, PVD, sputtering, spin-casting, UV curing, heat curing, photopolymerization, chemically-initiated polymerization, screen printing, inkjet printing, photolithography, crystallization, annealing, or other methods. The cathode could be formed with multiple materials. For example, the bulk of a formed cathode could include a bulk metal (e.g., aluminum) while a surface of the formed cathode could include manganese oxide. In some examples, forming the cathode could involve multiple processes. For example, the bulk of a formed cathode could be formed by PVD and photolithography, and a surface of the formed cathode could include a manganese oxide layer formed by spray deposition, electroplating, CVD, plasma oxidation or some other method. Other methods and combinations of methods are anticipated.

An anode is formed on the substrate, such that the anode is in contact with the second surface of the electrolyte, and the anode and cathode are non-overlapping (408). The formed cathode could include a variety of materials or combinations of materials. For example, the anode could include metals, conductive polymers, crystals, nanotubes, nanomaterials, oxides, or other materials. For example, the anode could include copper, zinc, lithium, aluminum, nickel, lead, iron, silver, gold, metal oxides, metal salts, metal alloys, doped polypyrrole, graphite, or some other material or materials. For example, the anode could be a zinc foil or deposited zinc film. The anode could be formed with multiple materials. An anode could be formed through a variety of methods or combinations of methods. For example, method of forming an anode could include CVD, PVD, sputtering, spin-casting, UV curing, heat curing, photopolymerization, chemically-initiated polymerization, screen printing, inkjet printing, photolithography, crystallization, annealing, or other methods. Other methods and combinations of methods are anticipated.

A biocompatible protective layer is formed, such that the biocompatible protectively layer covers the electrolyte and at least portions of the cathode and the anode (410). The biocompatible protective layer could be formed to cover additional structures. The formed biocompatible protective layer could include a variety of materials or combinations of materials. For example, the biocompatible protective layer could include metals, polymers, nanomaterials, or other materials. For example, the biocompatible protective layer could include polyanhydride, calcium hydroxylapatite, PTFE, parylene, silicone, silicon, glass, stainless steel, titanium, or some other material. Forming a biocompatible protective layer could include applying a surface treatment or applying a surface coating to a base material. For example, proteins could be adsorbed or otherwise bound to a surface of a material of the biocompatible protective layer. A biocompatible protective layer could be formed through a variety of methods or combinations of methods. For example, method of forming a biocompatible protective layer could include CVD, PVD, sputtering, spin-casting, UV curing, heat curing, photopolymerization, chemically-initiated polymerization, screen printing, inkjet printing, photolithography, plasma processing, crystallization, or other methods. Other methods and combinations of methods are anticipated.

The process 400 for fabricating an electrochemical battery could include additional steps. In some examples, the process 400 could include at least partially embedding the substrate and components disposed thereon (e.g., the electrolyte, the anode, the cathode) in a shaped polymeric material. The shaped polymeric material could have a concave surface and a convex surface, wherein the concave surface is configured to be removably mounted over a corneal surface of an eye and the convex surface is configured to be compatible with eyelid motion when the concave surface is so mounted. The shaped polymeric material could be a substantially transparent material to allow incident light to be transmitted to an eye. The polymeric material could be a biocompatible material similar to those employed to form vision correction and/or cosmetic contact lenses in optometry, such as polyethylene terephthalate ("PET"), polymethyl methacrylate ("PMMA"), silicone hydrogels, combinations of these, etc. The shaped polymeric material could be formed in a variety of ways. For example, techniques similar to those employed to form vision-correction contact lenses, such as heat molding, injection molding, spin casting, etc. can be employed to form the shaped polymeric material.

In some examples, the process 400 could include disposing the substrate and components disposed thereon (e.g., the electrolyte, the anode, the cathode) in a device with other components. The other components could include electronics, sensors, interconnects, conductive traces, wires, or other elements. The substrate could be mounted to a housing, a base, a printed circuit board, or some other element. The anode and/or cathode could be connected to other elements (e.g., electronics, wires, conductive traces) by a variety of methods. For example, the anode and/or cathode could be connected to other elements by welding, press-fitting, applying a conductive material (e.g., a conductive adhesive, epoxy, gel, and/or polymer), soldering, sputtering, CVD, PVD or some other method. Additionally or alternatively, some components (e.g., electronics, conductive traces) could be formed and/or disposed on the substrate.

In some examples, the process 400 could include forming more than one electrolyte, anode, and/or cathode. The more than one electrolyte, anode, and/or cathode could be formed similarly or differently. The more than one electrolyte, anode, and/or cathode could be formed at the same time or as port of different steps separated in time. The process 400 could further include forming interconnects between the multiple anodes and/or cathodes such that the multiple formed electrochemical cells (an electrochemical cell including a single electrolyte and corresponding anode(s) and cathode(s)) were electrically connected in series, in parallel, or according to some other configuration.

Note that the ordering of the steps of the example process 400 is meant as an illustrative example and not meant to be limiting. An ordering of steps of the process 400 could be chosen based on properties of the individual steps of the process 400. For example, forming a cathode 406 could include an annealing process occurring at a first temperature. Forming an electrolyte 404 could include forming an electrolyte that was damaged by temperatures exceeding a second temperature, where the second temperature was less than the first temperature. In such an example, the annealing process of forming a cathode 406 could occur before forming an electrolyte 404. Other processes and process considerations are possible. Thus, other ordering of the steps of the process 400 are anticipated.

CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

Further, where example embodiments involve information related to a person or a device of a person, some embodiments may include privacy controls. Such privacy controls may include, at least, anonymization of device identifiers, transparency and user controls, including functionality that would enable users to modify or delete information relating to the user's use of a product.

In situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from a content server that may be more relevant to the user. In addition, certain data may be treated in one or more ways before it is stored or used, so that personally identifiable information is removed. For example, a user's identity may be treated so that no personally identifiable information can be determined for the user. Thus, the user may have control over whether and how information about the user is collected and used.

What is claimed is:

1. A battery, comprising:
    a substrate;
    an electrolyte disposed on the substrate, wherein the electrolyte has a first surface extending from the substrate and a second surface extending from the substrate and opposite the first surface, wherein the first and second surfaces of the electrolyte are less than about 100 microns apart;
    a cathode disposed on the substrate and in contact with the first surface of the electrolyte;
    an anode disposed on the substrate and in contact with the second surface of the electrolyte, wherein the anode and cathode are non-overlapping; and
    a biocompatible protective layer, wherein the biocompatible protective layer covers the electrolyte and at least portions of the cathode and anode.

2. The battery of claim 1, wherein the battery has an overall thickness defined by respective thicknesses of the substrate, the biocompatible protective layer, and a thickest portion of the electrolyte, cathode, and anode between the substrate and the biocompatible protective layer, wherein the overall thickness is less than about 50 microns.

3. The battery of claim 1, wherein the biocompatible protective layer comprises parylene.

4. The battery of claim 1, wherein the substrate comprises silicon.

5. The battery of claim 1, wherein the electrolyte comprises a gel polymer.

6. The battery of claim 5, wherein the gel polymer comprises polyacrylonitrile, propylene carbonate, ethylene carbonate, and zinc trifluoromethane sulfonate.

7. The battery of claim 1, further comprising:
    a second electrolyte disposed on the substrate, wherein the second electrolyte has a first surface extending from the substrate and a second surface extending from the substrate and opposite the first surface;
    a second cathode disposed on the substrate and in contact with the first surface of the second electrolyte; and
    a second anode disposed on the substrate and in contact with the second surface of the second electrolyte, wherein the second anode and second cathode are non-overlapping;
    wherein the biocompatible protective layer additionally covers the second electrolyte and at least portions of the second cathode and second anode.

8. The battery of claim 1, wherein the electrolyte is configured as a closed loop.

9. The battery of claim 1, wherein the electrolyte has a spiral shape.

10. A body-mountable device comprising:
    a shaped polymeric material; and
    a battery embedded within the shaped polymeric material, wherein the battery comprises:
        a substrate;
        an electrolyte disposed on the substrate, wherein the electrolyte has a first surface extending from the substrate and a second surface extending from the substrate and opposite the first surface, wherein the first and second surfaces of the electrolyte are less than about 100 microns apart;
        a cathode disposed on the substrate and in contact with the first surface of the electrolyte;
        an anode disposed on the substrate and in contact with the second surface of the electrolyte, wherein the anode and cathode are non-overlapping; and
        a biocompatible protective layer, wherein the biocompatible protective layer covers the electrolyte and at least portions of the cathode and anode.

11. The body-mountable device according to claim 10, further comprising electronics embedded in the shaped polymeric material.

12. The body-mountable device according to claim 10, wherein the shaped polymeric material has a concave surface that can be removably mounted over a corneal surface of an eye and a convex surface opposite the concave surface.

13. The body-mountable device of claim 10, wherein the battery has an overall thickness defined by respective thicknesses of the substrate, the biocompatible protective layer, and a thickest portion of the electrolyte, cathode, and anode between the substrate and the biocompatible protective layer, wherein the overall thickness is less than about 50 microns.

14. The body-mountable device of claim 10, wherein the electrolyte comprises a gel polymer.

15. The body-mountable device of claim 14, wherein the gel polymer comprises polyacrylonitrile, propylene carbonate, ethylene carbonate, and zinc trifluoromethane sulfonate.

16. The body-mountable device of claim 10, wherein the biocompatible protective layer comprises parylene.

17. The body-mountable device of claim 10, wherein the battery further comprises:
    a second electrolyte disposed on the substrate, wherein the second electrolyte has a first surface extending from the substrate and a second surface extending from the substrate and opposite the first surface;
    a second cathode disposed on the substrate and in contact with the first surface of the second electrolyte; and
    a second anode disposed on the substrate and in contact with the second surface of the second electrolyte, wherein the second anode and second cathode are non-overlapping;
    wherein the biocompatible protective layer additionally covers the second electrolyte and at least portions of the second cathode and second anode.

18. A method comprising:
    forming a substrate;
    forming an electrolyte on the substrate, such that the electrolyte has a first surface extending from the substrate and a second surface extending from the substrate and opposite the first surface, wherein the first and second surfaces of the electrolyte are less than about 100 microns apart;

forming a cathode on the substrate, such that the cathode is in contact with the first surface of the electrolyte;

forming an anode on the substrate, such that the anode is in contact with the second surface of the electrolyte, and the anode and cathode are non-overlapping; and forming a biocompatible protective layer, such that the biocompatible protective layer covers the electrolyte and at least portions of the cathode and anode.

19. The method of claim 18, further comprising at least partially embedding the substrate and components disposed thereon in a shaped polymeric material, wherein the shaped polymeric material has a concave surface that can be removably mounted over a corneal surface of an eye and a convex surface opposite the concave surface.

* * * * *